United States Patent
Fujiwara

(10) Patent No.: US 9,434,342 B2
(45) Date of Patent: Sep. 6, 2016

(54) VEHICLE SEAT EQUIPPED WITH SIDE AIRBAG DEVICE

(71) Applicant: TOYOTA JIDOSHA KABUSHIKI KAISHA, Toyota-shi, Aichi-ken (JP)

(72) Inventor: Yusuke Fujiwara, Toyota-shi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 14/875,238

(22) Filed: Oct. 5, 2015

(65) Prior Publication Data

US 2016/0167611 A1 Jun. 16, 2016

(30) Foreign Application Priority Data

Dec. 11, 2014 (JP) ................................ 2014-251068

(51) Int. Cl.
*B60R 21/207* (2006.01)
*B60R 21/2165* (2011.01)

(52) U.S. Cl.
CPC ......... *B60R 21/207* (2013.01); *B60R 21/2165* (2013.01)

(58) Field of Classification Search
CPC .................... B60R 21/207; B60R 21/2165
See application file for complete search history.

(56) References Cited

U.S. PATENT DOCUMENTS

| 5,810,389 | A | 9/1998 | Yamaji et al. |
| 6,089,594 | A | 7/2000 | Hasegawa et al. |
| 6,561,540 | B1 | 5/2003 | Hasegawa et al. |
| 8,171,868 | B2 * | 5/2012 | Evans ...................... B60N 2/58 112/475.08 |
| 9,254,809 | B2 * | 2/2016 | Wiederhoeft ......... B60R 21/207 |
| 2010/0156071 | A1 | 6/2010 | Taguchi et al. |
| 2015/0115578 | A1 * | 4/2015 | Sahashi .................. B60N 2/427 280/728.3 |
| 2016/0096504 | A1 * | 4/2016 | Fujiwara ........... B60R 21/23138 280/729 |
| 2016/0129873 | A1 * | 5/2016 | Sahashi ................. B60R 21/207 297/216.13 |
| 2016/0129874 | A1 * | 5/2016 | Ushiyama ............. B60R 21/207 297/216.13 |

FOREIGN PATENT DOCUMENTS

| JP | H09-76859 A | 3/1997 |
| JP | H09-86327 A | 3/1997 |
| JP | H09-254735 A | 9/1997 |
| JP | 2010-030389 A | 2/2010 |
| JP | 2010-030390 A | 2/2010 |
| JP | 2010-143356 A | 7/2010 |

* cited by examiner

*Primary Examiner* — Laura Freedman
(74) *Attorney, Agent, or Firm* — Oliff PLC

(57) ABSTRACT

A vehicle seat that is equipped with a side airbag device includes: an airbag package that includes a side airbag that is housed within a side portion of a seatback; a seatback skin at which a burst line portion receives inflation pressure of the side airbag and breaks; and a seatback pad in which a vertical slit portion, that is positioned further toward a seat transverse direction outer side than a front edge portion of the airbag package, extends toward upper and lower sides of the side portion along the front edge portion. The side airbag inflates and expands with passing-through the vertical slit portion, and an upper end of the vertical slit portion is positioned further toward a seatback rear side than a lower end of the vertical slit portion.

13 Claims, 14 Drawing Sheets

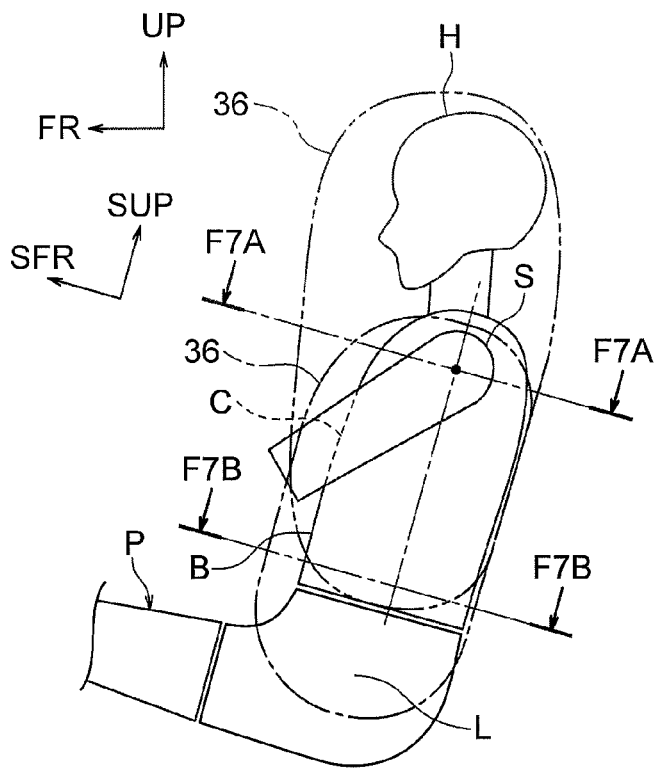
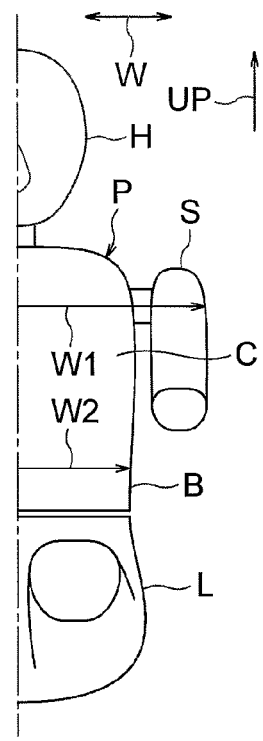
FIG.6A  FIG.6B
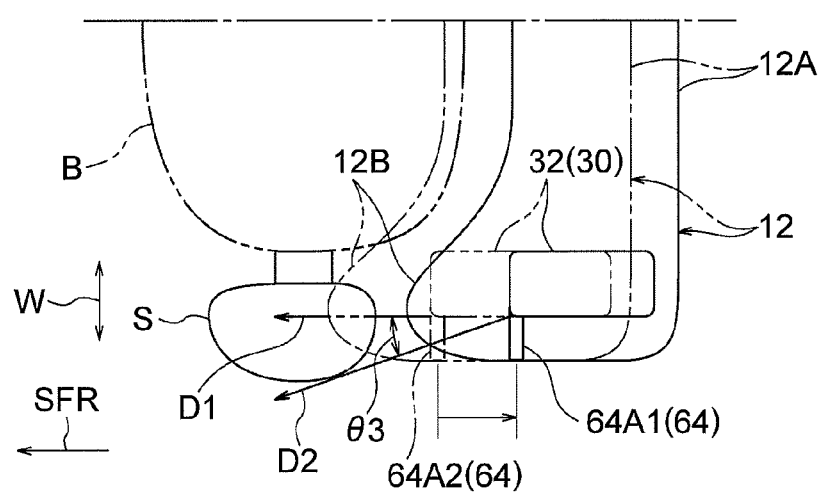
FIG.7

VEHICLE SEAT EQUIPPED WITH SIDE AIRBAG DEVICE

CROSS-REFERENCE TO RELATED APPLICATION

This application claims priority under 35 USC 119 from Japanese Patent Application No. 2014-251068 filed Dec. 11, 2014, the disclosure of which is incorporated by reference herein.

BACKGROUND

1. Technical Field

The present invention relates to a vehicle seat that is equipped with a side airbag device.

2. Related Art

A seat structure that is equipped with an airbag device for a side collision is disclosed in Japanese Patent Application Laid-Open (JP-A) No. 9-76859. In this structure, a substantially U-shaped slit is formed, with the seat rear side remaining, in a region of a side framing portion of a seat pad which region faces the outer peripheral portion of a side airbag. The region at the inner side of this slit is a cover portion for an airbag case, and opens toward the seat outer side at the time when the side airbag inflates and expands.

An airbag device for a side collision is disposed in JP-A No. 9-254735. In this device, a sewn portion (a burst line portion), that ruptures due to the expansion pressure of a side airbag is provided in a surface material of the backrest portion of a seat (in the seatback skin), in a vicinity of the opening portion of an airbag case. Further, a seatback pad of a predetermined thickness is interposed between the seatback skin and the airbag case. A slit portion, that is rectilinear or is substantially U-shaped and through which the side airbag is inserted at the time of expansion, is formed in this seatback pad at the inner side of the burst line portion.

Among side airbags such as those described above, there are those that are large-sized and restrain a region that includes not only the chest portion of a vehicle occupant, but the shoulder portion as well. For example, there are side airbags that restrain the region from the lumbar portion to the shoulder portion of a vehicle occupant, and there are side airbags that restrain the region from the abdominal portion to the head portion of a vehicle occupant. There are cases in which it is difficult to inflate and expand such large-sized side airbags stably in the intended direction or at the intended position with respect to the vehicle occupant. The tendency for the expanding direction of a side airbag to become unstable is marked particularly in cases in which the sewing line of the seatback skin that structures the burst line portion is set in a complex shape.

SUMMARY

In consideration of the above-described circumstances, the present invention provides a vehicle seat that is equipped with a side airbag device, that contributes to stabilizing the expanding direction of a side airbag that can restrain at least the region from the abdominal portion to the shoulder portion of a vehicle occupant.

A vehicle seat that is equipped with a side airbag device of a first aspect of the present invention has: an airbag package that includes a side airbag that is housed in a state of being folded-up within a side portion of a seatback, the side airbag being able to restrain at least a region from an abdominal portion to a shoulder portion of a vehicle occupant in an inflated and expanded state; a seatback skin at which a burst line portion, that extends toward upper and lower sides of the side portion at a seatback front side of the airbag package, receives inflation pressure of the side airbag and breaks; and a seatback pad in which a vertical slit portion, that is positioned further toward a seat transverse direction outer side than a front edge portion of the airbag package, extends toward the upper and lower sides of the side portion along the front edge portion, the side airbag inflating and expanding with passing-through the vertical slit portion, and an upper end of the vertical slit portion being positioned further toward a seatback rear side than a lower end of the vertical slit portion.

In the first aspect, the airbag package that is disposed within the side portion of the seatback includes a side airbag that is folded-up. In the inflated and expanded state, this side airbag can restrain at least the region from the abdominal portion to the shoulder portion of a vehicle occupant. At the time of inflation and expansion of the side airbag, the side airbag passes-through the vertical slit portion of the seatback pad, and breaks the burst line portion of the seatback skin.

The above-described vertical slit portion is positioned further toward a seat transverse direction outer side than the front edge portion of the airbag package, and extends toward the upper and lower sides of the side portion, along the front edge portion. The upper end of the vertical slit portion is positioned further toward the seatback rear side than the lower end of the vertical slit portion. Therefore, at the side airbag, the region that passes-through the upper end side of the vertical slit portion inflates and expands from further toward the seatback rear side than the region that passes-through the lower end side of the vertical slit portion. As a result, the difference in the expanding directions, as seen in plan view, of the region at the side airbag which region passes-through the upper end side of the vertical slit portion and inflates and expands at the side of the shoulder portion of the vehicle occupant, and the region of the side airbag which region passes-through the lower end side of the vertical slit portion and inflates and expands at the side of the chest portion and the abdominal portion of the vehicle occupant, can be made to be small. Due thereto, controlling (adjustment) of the expanding direction of the side airbag, that can restrain at least the region from the abdominal portion to the shoulder portion of a vehicle occupant, is easy, and therefore, this contributes to stabilization of the expanding direction.

In a vehicle seat that is equipped with a side airbag device of a second aspect of the present invention, in the first aspect, the seatback pad has a lateral slit portion that extends from the upper end of the vertical slit portion toward the seatback rear side.

In accordance with the second aspect, at the time of inflation and expansion of the side airbag, the region at the side airbag, which region is positioned beneath the lateral slit portion, receives the inflation pressure of the side airbag and expands toward the seat transverse direction outer side. Due thereto, the vertical slit portion, and the upper end side thereof in particular, is expanded toward the seatback rear side. As a result, at the side airbag, the region, that passes-through the upper end side of the vertical slit portion and inflates and expands, inflates and expands from further toward the seatback rear side. Due thereto, the aforementioned "difference in expanding directions" can be made to be even smaller, and therefore, stabilization of the expanding direction of the side airbag can be promoted.

In a vehicle seat that is equipped with a side airbag device relating to a third aspect of the present invention, in the first aspect, the lower end of the vertical slit portion is positioned further toward a seatback lower side than a lower edge portion of the airbag package.

Because the third aspect is structured as described above, at the time when the side airbag passes-through the vertical slit portion and inflates and expands, it is easy for the lower end side of the vertical slit portion to open greatly in a vicinity of the lower edge portion of the airbag package. Due thereto, the expanding direction of the region of the side airbag, which region passes-through the lower end side of the vertical slit portion and inflates and expands, becoming unstable due to interference with the seatback pad can be prevented or suppressed. As a result, stabilization of the expanding direction of the side airbag can be promoted.

In a vehicle seat that is equipped with a side airbag device of a fourth aspect of the present invention, in the first aspect, the burst line portion includes a front side burst line portion that extends toward the upper and lower sides of the side portion at a front portion of the side portion, and a lateral burst line portion that is connected to the front side burst line portion at an upper portion side of the side portion, and that extends obliquely toward a seatback rear side and upper side along a side surface of the side portion.

In the fourth aspect, in a case in which the burst line portion receives inflation pressure of the side airbag and starts to break from the front side burst line portion, this breakage propagates from the front side burst line portion to the lateral burst line portion. Because the lateral burst line portion extends obliquely toward the seatback rear side and upper side along the side surface of the side portion of the seatback, the angle that is formed by the front side burst line portion and the lateral burst line portion can be set to be an obtuse angle. Due thereto, as compared with a case in which this formed angle is formed to be a right angle for example, the propagation of the breakage from the upper end portion of the front side burst line portion to the front end portion of the lateral burst line portion can be made to be smooth.

In a vehicle seat that is equipped with a side airbag device relating to a fifth aspect of the present invention, in the fourth aspect, the burst line portion further includes a vertical burst line portion that extends toward a seatback upper side from an intermediate portion of the lateral burst line portion.

In the fifth aspect, because the burst line portion also has the above-described vertical burst line portion, the burst line portion can be broken to further toward the upper end side of the seatback. Due thereto, it is easy for the upper portion side of the side airbag to inflate and expand toward the seatback upper side, and therefore, stabilization of the expanding direction of this upper portion side can be promoted.

In a vehicle seat that is equipped with a side airbag device of a sixth aspect of the present invention, in the fifth aspect, the seatback pad has a lateral slit portion that extends toward the seatback rear side from the upper end of the vertical slit portion, and the vertical burst line portion is positioned further toward the seatback upper side than the lateral slit portion and further toward the seatback front side than a rear end of the lateral slit portion.

In the sixth aspect, the side airbag passes-through the vertical slit portion and the lateral slit portion of the seatback pad, and breaks the burst line portion of the seatback skin, and inflates and expands. The vertical burst line portion that the burst line portion has is positioned further toward the seatback upper side than the lateral slit portion and further toward the seatback front side than the rear end of the lateral slit portion. Due thereto, the region of the side airbag, which region passes-through the upper end side of the vertical slit portion and inflates and expands, catching on the region of the seatback skin, which region is further toward the seatback front side than the vertical burst line portion, can be prevented or suppressed. Therefore, the occurrence of poor expansion that is caused by this catching can be prevented or suppressed.

In a vehicle seat that is equipped with a side airbag device of a seventh aspect of the present invention, in the first aspect, at a heightwise range of the seatback where the vertical slit portion is positioned, a region of the vertical slit portion from the upper end to the lower end thereof is positioned further toward the seatback rear side than the burst line portion.

Because the seventh aspect is structured as described above, there is no need for some of the expansion force to be directed toward the seatback rear side in order for the side airbag, that passes-through the vertical slit portion of the seatback pad and inflates and expands, to break the burst line portion of the seatback skin. Due thereto, this contributes to making the inflation and the expansion of the side airbag be earlier. Further, the side airbag, that passed-through the vertical slit portion, catching on the region of the seatback skin, which region is further toward the seatback front side than the burst line portion, can be prevented or suppressed. Therefore, the occurrence of poor expansion that is caused by this catching can be prevented or suppressed.

In a vehicle seat that is equipped with a side airbag device of an eighth aspect of the present invention, in the first aspect, an upper portion of a seat transverse direction outer side surface of a side frame of the seatback includes an inclined surface that faces obliquely toward a seat transverse direction outer side and upper side, and an upper portion of the airbag package includes a region that faces the inclined surface.

In the eighth aspect, the upper portion of the seat transverse direction outer side surface of the side frame of the seatback includes the inclined surface. A region that faces this inclined surface is included at the upper portion of the airbag package. Because this inclined surface faces obliquely toward the seat transverse direction outer side and upper side, the upper portion side of the side airbag, that is folded-up at the upper portion of the airbag package, receives, from the inclined surface, expansion reaction force that is directed obliquely toward the seat transverse direction outer side and upper side. Due thereto, it is easy for the upper portion side of the side airbag to inflate and expand toward the seatback upper side as seen in a seat front view. Therefore, the expanding direction of the upper portion side of the side airbag can be stabilized so as to be directed toward the side of the shoulder portion or the side of the head portion of the vehicle occupant.

In a vehicle seat that is equipped with a side airbag device of a ninth aspect of the present invention, in the first aspect, a lower portion of a seat transverse direction outer side surface of a side frame of the seatback includes a vertical surface that faces toward a seat transverse direction outer side, and a lower end portion of the airbag package includes a region that faces the vertical surface.

In the ninth aspect, the lower portion of the seat transverse direction outer side surface of the side frame of the seatback includes the vertical surface. A region that faces this vertical surface is included at the lower end portion of the airbag package. Because this vertical surface faces toward the seat transverse direction outer side, the lower end side of the side airbag, that is folded-up at the lower end portion of the airbag package, receives, from the vertical surface, expansion reaction force that is directed toward the seat transverse direction outer side. Due thereto, the lower end side of the side airbag, i.e., the region that restrains the abdominal portion or the lumbar portion of the vehicle occupant, inadvertently rising-up toward the seatback upper side at the time of inflation and expansion can be prevented or suppressed.

In a vehicle seat that is equipped with a side airbag device of a tenth aspect of the present invention, in the fourth aspect, an angle that is formed by an upper end side of the front side burst line portion and the lateral burst line portion is set to be an obtuse angle.

In a vehicle seat that is equipped with a side airbag device of an eleventh aspect of the present invention, in the fifth aspect, the front side burst line portion is structured by a front side sewn portion, and the lateral burst line portion is structured by a front portion side of a lateral sewn portion, and the vertical burst line portion is structured by a vertical sewn portion, and a rear portion side of the lateral sewn portion extends obliquely toward a seatback rear side and lower side, and the lateral sewn portion is formed so as to be convex toward the seatback upper side, and the vertical sewn portion extends toward the seatback upper side from a point that is further toward the seatback front side than a peak of the lateral sewn portion.

In a vehicle seat that is equipped with a side airbag device of a twelfth aspect of the present invention, in the first aspect, a lower portion of the vertical slit portion extends along a seatback vertical direction, and a vertical direction intermediate portion and an upper portion of the vertical slit portion is inclined with respect to the seatback vertical direction, so as to head toward the seatback rear side while heading toward a seatback upper side.

In a vehicle seat that is equipped with a side airbag device of a thirteenth aspect of the present invention, in the fifth aspect, the vertical slit portion is positioned at the seatback rear side with respect to the front side burst line portion, the vertical slit portion is positioned at the seatback rear side and a seatback lower side with respect to the lateral burst line portion, and the vertical slit portion is positioned at the seatback lower side with respect to the vertical burst line portion.

BRIEF DESCRIPTION OF THE DRAWINGS

Exemplary embodiments of the present invention will be described in detail based on the following figures, wherein:

FIG. 6A is a side view of a vehicle occupant who is seated in the vehicle seat;

FIG. 6B is a front view showing the left half portion of the vehicle occupant;

FIG. 7 is a cross-sectional view showing, in an enlarged manner, the schematic cut cross-section along line F7A-F7A of FIG. 6A and the schematic cut cross-section along line F7B-F7B of FIG. 6A that are superposed together;

DETAILED DESCRIPTION

A vehicle seat 10 that is equipped with a side airbag device and relates to an embodiment of the present invention (hereinafter simply called "vehicle seat 10") is described by using FIG. 1 through FIG. 17. Note that arrow FR, arrow UP and arrow W that are marked appropriately in the respective drawings respectively indicate the forward direction (advancing direction), the upward direction, and the transverse direction of the vehicle.

(Structure)

Figure 1:
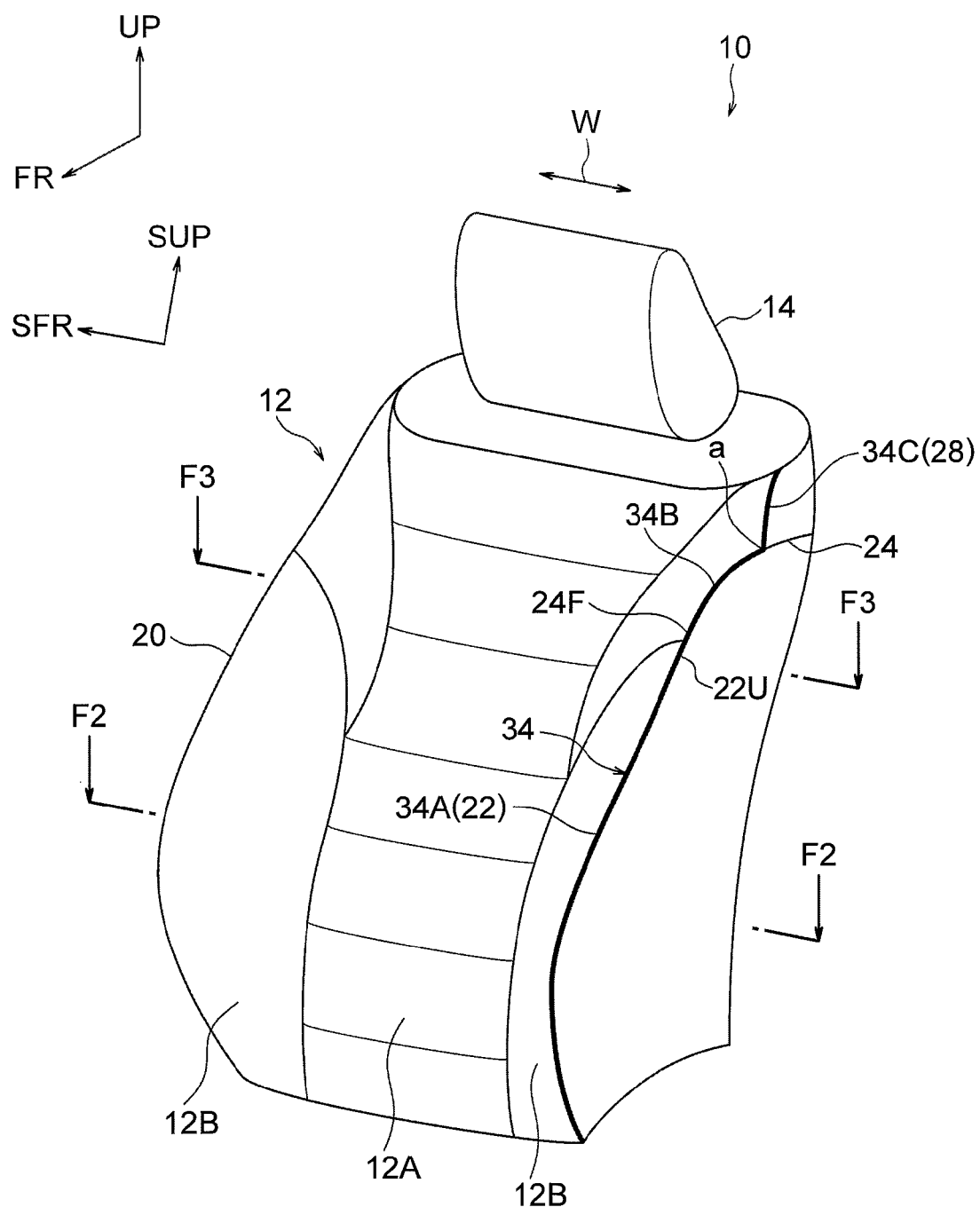
FIG. 1 is a perspective view of a seatback and a headrest that are structural members of a vehicle seat that is equipped with a side airbag device relating to an embodiment of the present invention.

As shown in FIG. 1, the vehicle seat 10 has a seatback 12 that is the backrest of a vehicle occupant. This seatback 12 is reclinably connected to the rear end portion of a seat cushion (not illustrated) on which the vehicle occupant sits, and a headrest 14 is connected to the upper end portion of the seatback 12. This vehicle seat 10 is, for example, the driver's seat or the front passenger's seat of a vehicle (an automobile), and the longitudinal direction, the vertical direction and the transverse direction (left-right direction) thereof coincide with the longitudinal direction, the vertical direction and the transverse direction (left-right direction) of the vehicle.

Further, arrow SFR that is marked appropriately in the respective drawings indicates the front of the seatback 12, and arrow SUP indicates the upper side of the seatback 12. The transverse direction (left-right direction) of the seatback 12 coincides with the seat transverse direction (the vehicle transverse direction). Hereinafter, when merely longitudinal, left-right, and vertical directions are used, they mean the longitudinal, the left-right and the vertical directions of the seatback 12 unless otherwise indicated.

The left-right direction central portion of the seatback 12 is a main body portion 12A, and the left-right direction both side portions are side support portions 12B. The left and right side support portions 12B are structures that project-out further toward the seatback front side than the main body portion 12A, and support the upper body of the vehicle occupant, who is leaning against the main body portion 12A, from the seat transverse direction outer sides.

Figure 2:
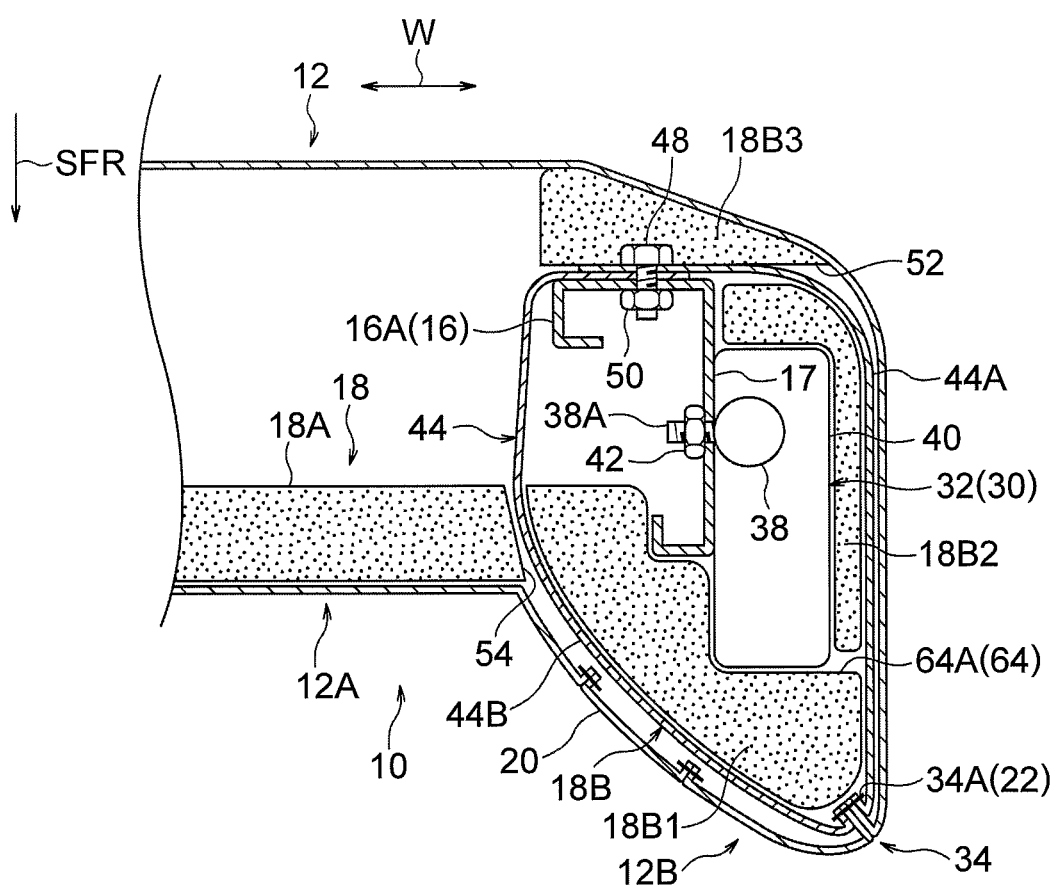
FIG. 2 is an enlarged sectional view showing, in an enlarged manner, the cross-section cut along line F2-F2 of FIG. 1.
Figure 3:
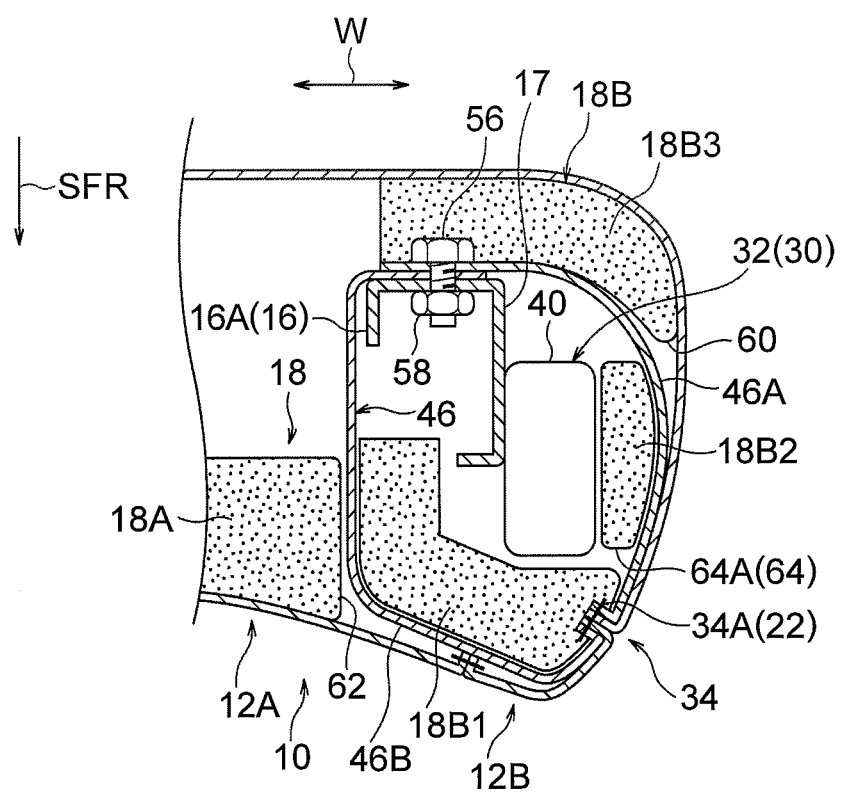
FIG. 3 is an enlarged sectional view showing, in an enlarged manner, the cross-section cut along line F3-F3 of FIG. 1.

As shown in FIG. 2 and FIG. 3, at the above-described seatback 12, a seatback pad 18 that is mounted to a seatback frame 16 is covered by a seatback skin 20. The seatback frame 16 structures the skeleton of the seatback 12, and has, at the left and right both sides of the seatback 12, left and right side frames 16A that extend in the vertical direction (the length direction) of the seatback 12 (see FIG. 4 and FIG. 5: the side frame 16A at the seat right side is not illustrated). The upper end portions of the left and right side frames 16A are connected in the seat transverse direction by an upper frame 16B (see FIG. 5). The lower end portions of the left and right side frames 16A are connected in the seat transverse direction by an unillustrated lower frame.

The seatback pad 18 structures the cushion material of the seatback 12. This seatback pad 18 has a pad main body portion 18A that is disposed at the main body portion 12A of the seatback 12, and left and right pad side portions 18B that are disposed at the left and right side support portions 12B (the pad side portion 18B at the seat right side is not illustrated). As seen from the seatback vertical direction, the left and right pad side portions 18B are formed in substantial C-shapes in cross-section whose seat transverse direction inner sides are open, and surround the left and right side frames 16A from the seatback longitudinal direction and the seat transverse direction outer sides.

Note that, although the pad main body portion 18A and the left and right pad side portions 18B are molded integrally, in the cross-sections shown in FIG. 2 and FIG. 3, the pad main body portion 18A and the pad side portion 18B are divided in the seat transverse direction by webbing insert-through holes 54, 62 that are formed in the seatback pad 18. Further, in the cross-sections shown in FIG. 2 and FIG. 3, a rear portion 18B3 of the pad side portion 18B is divided in the seatback longitudinal direction by webbing insert-through holes 52, 60. Moreover, in the cross-sections shown in FIG. 2 and FIG. 3, a front portion 18B1 of the pad side portion 18B and a side wall portion 18B2 of the pad side portion 18B are divided in the seatback longitudinal direction by a slit 64. This slit 64 is described in detail later.

The seatback skin 20 structures the skin material of the seatback 12 and is covered on the seatback pad 18. This seatback skin 20 is formed by plural skin pieces, that are formed of a cloth material, leather, synthetic leather, or the like, being sewn together at plural sewn portions. Note that, in FIG. 1, the lines that are drawn on the surface of the seatback 12 all illustrate sewn portions.

In the present embodiment, a complex sewing pattern is employed at the left and right side support portions 12B, and the sewn portions (the sewing lines) are set in complex shapes. Due thereto, the design of the seatback 12 improves.

Front side sewn portions 22 are included among the sewn portions that are set at the left and right side support portions 12B. The front side sewn portion 22 extends in the seatback vertical direction along the front portion (here, the front edge portion) of the side support portion 12B. An upper end 22U of the front side sewn portion 22 is positioned at the upper portion of the seatback 12, and is connected to a front end 24F of a lateral sewn portion 24.

The lateral sewn portion 24 extends obliquely toward the seatback rear side and upper side, along the side surface of the side support portion 12B. The angle of inclination of the lateral sewn portion 24 toward the seatback rear side is set to be larger than that of the upper portion side of the front side sewn portion 22. The rear end of the lateral sewn portion 24 is connected to a back surface side sewn portion 26 (see FIG. 4) that is set at the back surface side of the seatback 12. When seen from the seat transverse direction, the lateral sewn portion 24 is curved so as to be convex obliquely toward the seatback front side and upper side.

Further, at the side surface of the side support portion 12B, a vertical sewn portion 28 is set further toward the upper end side of the seatback 12 than the lateral sewn portion 24. The vertical sewn portion 28 extends in the seatback vertical direction, in a vicinity of the longitudinal direction center of the upper end portion of the side surface of the side support portion 12B. The lower end of this vertical sewn portion 28 is connected to a longitudinal direction intermediate portion of the lateral sewn portion 24, and the upper end reaches the upper end of the seatback 12.

Here, in the present embodiment, an airbag package 32 that structures a main portion of a side airbag device 30 is accommodated at the inner side of the side support portion 12B that is at the seat left side (hereinafter called "left-side side portion 12B"). This side airbag device 30 is a near side airbag device that restrains a vehicle occupant from the vehicle transverse direction outer side by a side airbag, or is a far side airbag device that restrains a vehicle occupant from the vehicle transverse direction central side by a side airbag.

Note that, in a case in which the side airbag device 30 is a near side airbag device, the left-side side portion 12B is "the side portion at the vehicle transverse direction outer side of the seatback 12". On the other hand, in a case in which the side airbag device 30 is a far side airbag device, the left-side side portion 12B is "the side portion at the vehicle transverse direction central side of the seatback 12". Further, in a case in which the airbag package 32 is accommodated within the side support portion 12B that is at the seat right side (right-side side portion), the structure has left-right symmetry with respect to the present embodiment.

At the left-side side portion 12B in which the airbag package 32 is housed as described above, a burst line portion 34 is structured by the above-described front side sewn portion 22, lateral sewn portion 24 and vertical sewn portion 28. Note that, in FIG. 1, FIG. 4, FIG. 11, FIG. 16 and FIG. 17, the regions that structure the burst line portion 34 are shown by thick lines at the front side sewn portion 22, the lateral sewn portion 24 and the vertical sewn portion 28, in order to easily discern the burst line portion 34.

The burst line portion 34 is structured by a front side burst line portion 34A that is structured by the front side sewn portion 22, a lateral burst line portion 34B that is structured by a portion of the lateral sewn portion 24 (the region that is further toward the seatback front side than the lower end of the vertical sewn portion 28), and a vertical burst line portion 34C that is structured by the vertical sewn portion 28. At this burst line portion 34, the front side burst line portion 34A extends toward the upper and lower sides of the left-side side portion 12B at the seatback front side of the airbag package 32.

At this burst line portion 34, the skin pieces are sewn together by thread that is weaker than at the other sewn portions. Due thereto, there is a structure in which, at the time of inflation and expansion of a side airbag 36 that the airbag package 32 has, the burst line portion 34 receives inflation pressure of the side airbag 36 and is broken (ruptured).

The above-described airbag package 32 is disposed so as to abut a seat transverse direction outer side surface 17 of the side frame 16A that is at the seat left side (hereinafter called left side frame 16A). This airbag package 32 is surrounded from the seatback longitudinal direction and the seat transverse direction outer side by the pad side portion 18B. Note that, in FIG. 4, the airbag package 32 is marked by dots in order to make it easy to discern the airbag package 32.

The airbag package 32 is also called an airbag module, and is structured with the side airbag 36 (see FIG. 6A and FIG. 9: not shown in FIG. 2 and FIG. 3) and an inflator 38 being the main portions thereof. In the airbag package 32, the side airbag 36 is folded-up by a predetermined method of folding such as bellows-folding or roll-folding or the like (here, bellows-folding), and is made into a module together with the inflator 38. Further, the airbag package 32 that is elongated and parallelepiped is formed due to the folded-up side airbag 36 being enveloped by a wrapping material 40 that breaks easily. The length direction of the airbag package 32 runs along the seatback vertical direction.

Figure 4:
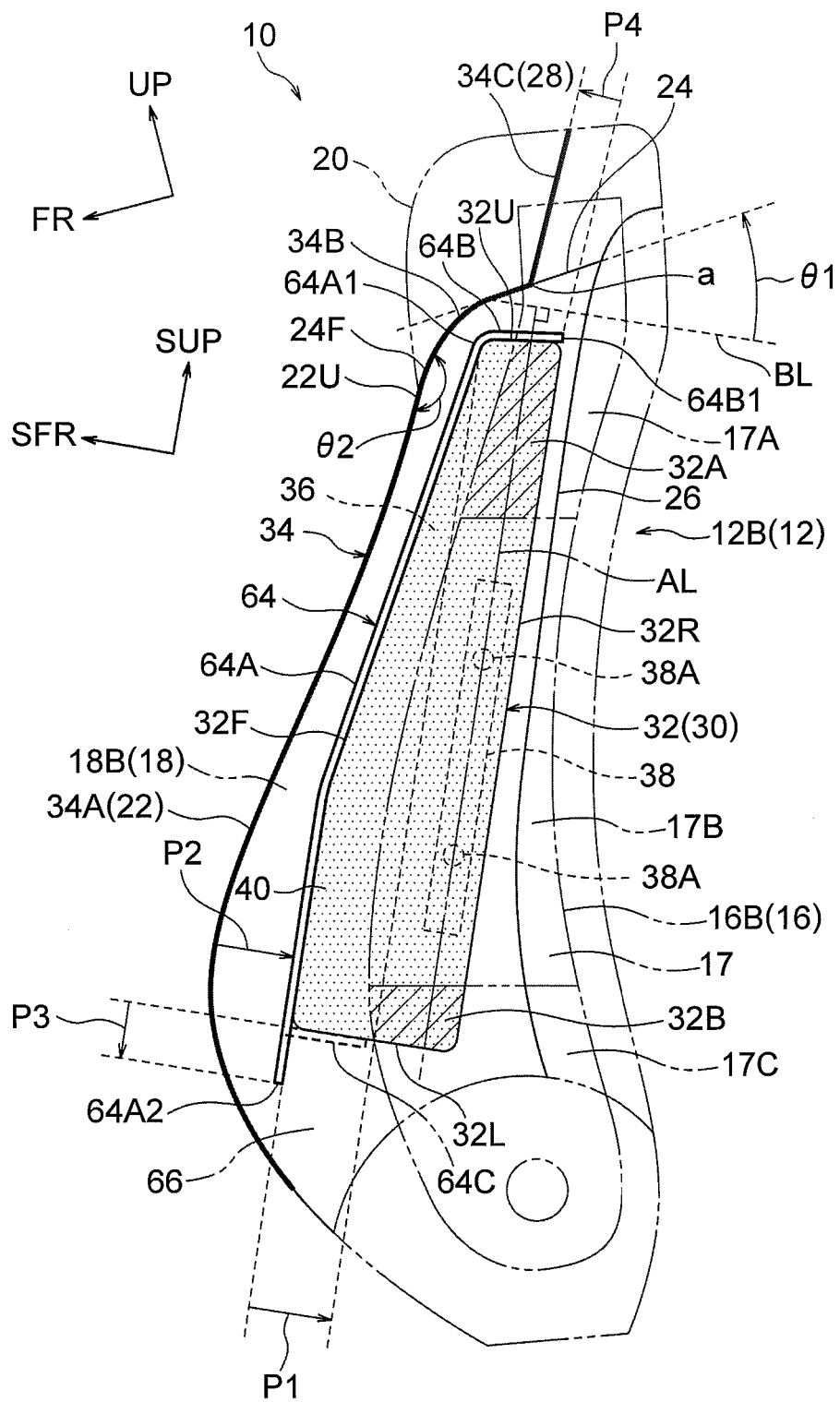
FIG. 4 is a side view showing the structure of the periphery of an airbag package at the seatback.

A rear edge portion 32R of the airbag package 32 runs along the seatback vertical direction, and an upper edge portion 32U and a lower edge portion 32L of the airbag package 32 run along the seatback longitudinal direction. On the other hand, the lower portion of a front edge portion 32F of the airbag package 32 runs along the seatback vertical direction, and the vertical direction intermediate portion and upper portion are inclined so as to head toward the seatback rear side while heading toward the seatback upper side. Due thereto, as shown in FIG. 4, the airbag package 32 is formed in a trapezoidal shape as seen from the seat transverse direction.

As seen in a seat side view, the airbag package 32 is positioned at the seatback rear side with respect to the front side burst line portion 34A, and is positioned at the seatback rear side and the seatback lower side with respect to the lateral burst line portion 34B, and is positioned at the seatback lower side with respect to the vertical burst line portion 34C.

The side airbag 36 that the airbag package 32 has is formed in the shape of an elongated bag due to a single base cloth, that is formed by cutting-out a nylon or polyester cloth material for example, being folded in two and the outer peripheral edge portion thereof being sewn. Due to the pressure of gas generated from the inflator 38, the side airbag 36 inflates and expands toward the front side of the left-side side portion 12B while breaking (rupturing) the burst line portion 34, and restrains, from the side, a vehicle occupant P (see FIG. 6A and FIG. 6B) who is seated in the vehicle seat 10.

In a case in which the side airbag device 30 is a near side airbag device, the side airbag 36 is formed to a size that can, for example, restrain the region from a lumbar portion L to a shoulder portion S (the lumbar portion L, an abdominal portion B, a chest portion C, and the shoulder portion S) of the vehicle occupant P (refer to the side airbag 36 shown by the one-dot chain line in FIG. 6A). On the other hand, in a case in which the side airbag device 30 is a far side airbag device, the side airbag 36 is formed to a size that can, for example, restrain the region from the abdominal portion B to a head portion H (the abdominal portion B, the chest portion C, the shoulder portion S, and the head portion H) of the vehicle occupant P (refer to the side airbag 36 shown by the two-dot chain line in FIG. 6A).

Note that the vehicle occupant P that is shown in FIG. 6A and FIG. 6B is, for example, an AM50 (50th percentile U.S. adult male) World SID (internationally standardized side crash dummy. World Side Impact Dummy). Further, the size of the side airbag 36 is not limited to those described above, and it suffices for the side airbag 36 to be a size such that it can restrain at least the region from the abdominal portion B to the shoulder portion S of the vehicle occupant P.

The inflator 38 is a so-called cylinder-type gas generating device, and is formed in the shape of a cylindrical tube. The inflator 38 is accommodated at the lower portion side and the rear end side of the interior of the side airbag 36, in a posture in which an axis AL runs along the seatback vertical direction. A pair of upper and lower stud bolts 38A (see FIG. 2, FIG. 4) project-out from the outer peripheral portion of the inflator 38.

The upper and lower stud bolts 38A pass-through the base cloth of the side airbag 36 and the side frame 16A, and nuts 42 are screwed-together with the distal end sides thereof. Due thereto, the inflator 38 is, together with the side airbag 36, fastened and fixed to the seatback frame 16. Note that, in the present embodiment, the axial direction of the inflator 38 (the direction in which the axis AL extends) and the vertical direction of the seatback 12 coincide. Further, as seen in a seat side view, the axis AL of the inflator 38 and the longitudinal direction of the seatback 12 are orthogonal.

An unillustrated ECU (control device) that is installed in the vehicle is electrically connected to the inflator 38. An unillustrated side collision sensor that senses a side collision of the vehicle is electrically connected to this ECU. The ECU and the side collision sensor are structural members of the side airbag device 30. The ECU is structured to operate (activate) the inflator 38 at the time of sensing (the inevitability of) a side collision of the vehicle on the basis of a signal from the side collision sensor. Note that, in a case in which a pre-crash sensor that forecasts (predicts) a side collision is electrically connected to the ECU, there may be a structure in which the inflator 38 is activated at the time when the ECU forecasts a side collision on the basis of a signal from the pre-crash sensor.

A lower side webbing 44 and an upper side webbing 46 (refer to FIG. 2, FIG. 3, FIG. 9, FIG. 11: not shown in FIG. 4, FIG. 5, FIG. 8, FIG. 13, FIG. 14), that are for transmitting the inflation pressure of the side airbag 36 to the burst line portion 34, are disposed at the periphery of the above-described airbag package 32. The lower side webbing 44 and the upper side webbing 46 are formed in elongated strip shapes from, for example, cloth materials that are harder to stretch than the base cloth of the side airbag 36.

The lower side webbing 44 is disposed at the periphery of the lower portion of the airbag package 32, and, as shown in FIG. 2, has an outer side portion 44A and an inner side portion 44B. One length direction end portion of the outer side portion 44A and one length direction end portion of the inner side portion 44B are superposed on the back surface of the left side frame 16A, and are fastened and fixed to the back surface of the left side frame 16A by a bolt 48 and a nut 50.

The outer side portion 44A passes-through the webbing insert-through hole 52 from the back surface side of the left side frame 16A, and extends between the side surface of the pad side portion 18B and the seatback skin 20. The other length direction end portion of the outer side portion 44A is sewn together with the front side sewn portion 22 (the front side burst line portion 34A). The inner side portion 44B extends from the back surface side of the left side frame 16A toward the seat transverse direction inner side of the left side frame 16A, and passes-through the webbing insert-through hole 54, and extends between the front surface of the pad side portion 18B and the seatback skin 20. The other length direction end portion of the inner side portion 44B is sewn together to the front side sewn portion 22.

The upper side webbing 46 is disposed at the periphery of the upper portion of the airbag package 32, and, as shown in FIG. 3, has an outer side portion 46A and an inner side portion 46B. One length direction end portion of the outer side portion 46A and one length direction end portion of the inner side portion 46B are superposed on the back surface of the left side frame 16A, and are fastened and fixed to the back surface of the left side frame 16A by a bolt 56 and a nut 58.

The outer side portion 46A passes-through the webbing insert-through hole 60 from the back surface side of the left side frame 16A, and extends between the side surface of the pad side portion 18B and the seatback skin 20. The other length direction end portion of the outer side portion 46A is sewn together with the front side sewn portion 22 (the front side burst line portion 34A). The inner side portion 46B extends from the back surface side of the left side frame 16A toward the seat transverse direction inner side of the left side frame 16A, and passes-through the webbing insert-through hole 62, and extends between the front surface of the pad side portion 18B and the seatback skin 20. The other length direction end portion of the inner side portion 46B is sewn together to the front side sewn portion 22.

Here, in the present embodiment, the slit 64 (see FIG. 2 through FIG. 4), that is for causing the side airbag 36 to inflate and expand to the outer side of the seatback pad 18, is formed in the pad side portion 18B of the seatback pad 18. This slit 64 has a vertical slit portion (slit main body portion) 64A that is positioned at the seat transverse direction outer side of the front edge portion 32F of the airbag package 32. The vertical slit portion 64A is formed between the front portion 18B1 and the side wall portion 18B2 of the pad side portion 18B, and extends toward the upper and lower sides of the left-side side portion 12B along the front edge portion 32F of the airbag package 32.

In detail, the lower portion of the vertical slit portion 64A extends along the seatback vertical direction, in the same way as the lower portion of the front edge portion 32F of the airbag package 32. On the other hand, the vertical direction intermediate portion and upper portion of the vertical slit portion 64A is inclined, with respect to the seatback vertical direction, so as to head toward the seatback rear side while heading toward the seatback upper side. Due thereto, an upper end 64A1 of the vertical slit portion 64A is positioned further toward the seatback rear side than a lower end 64A2 (refer to arrow P1 in FIG. 4).

At the heightwise range where the vertical slit portion 64A is positioned at the seatback 12, the region of the vertical slit portion 64A from the upper end 64A1 to the lower end 64A2 is positioned further toward the seatback rear side than the burst line portion 34 (refer to arrow P2 of FIG. 4). In detail, this vertical slit portion 64A is positioned at the seatback rear side with respect to the front side burst line portion 34A, and is positioned at the seatback rear side and the seatback lower side with respect to the lateral burst line portion 34B, and is positioned at the seatback lower side with respect to the vertical burst line portion 34C.

In the seatback vertical direction, the upper end 64A1 of the vertical slit portion 64A is positioned at a height that is equal to that of the upper edge portion 32U of the airbag package 32. The height at which the upper end 64A1 of the vertical slit portion 64A is positioned is made to be, for example, a height that is equal to that of the shoulder portion S of the vehicle occupant P. A lateral slit portion 64B extends-out toward the seatback rear side from the upper end 64A1 of the vertical slit portion 64A. This lateral slit portion 64B, together with the vertical slit portion 64A, structures the slit 64. The lateral slit portion 64B is positioned at the seat transverse direction outer side of the upper edge portion 32U of the airbag package 32, and extends along the upper edge portion 32U.

The lower end portion of the vertical slit portion 64A extends further toward the seatback lower side than the lower edge portion 32L of the airbag package 32. The lower end 64A2 of the vertical slit portion 64A is positioned further toward the seatback lower side than the lower edge portion 32L (refer to arrow P3 of FIG. 4). Note that, instead of the lower end portion of the vertical slit portion 64A extending further toward the seatback lower side than the lower edge portion 32L of the airbag package 32, there may be a structure in which a lower lateral slit portion 64C shown by the broken line in FIG. 4 extends toward the seatback rear side from the lower end of the vertical slit portion 64A.

Further, in the present embodiment, an excess margin portion 66 (see FIG. 4 and FIG. 8) at which the vertical slit portion 64A is not formed is provided between the lower end 64A2 of the vertical slit portion 64A and the lower edge portion of the pad side portion 18B. By providing this excess margin portion 66, it is easy to maintain the shape of the seatback pad 18 at the time of assembling the seatback pad 18 to the seatback frame 16. Further, at the surface of the seatback skin 20 that structures the external design of the side surface of the seatback 12, it is difficult for a step caused by the vertical slit portion 64A to arise, and therefore, the quality of the external appearance of the seatback 12 can be made to be good. Note that, in cases in which problems do not arise with respect to the aforementioned shape maintenance or external appearance quality, it is preferable to form the vertical slit portion 64A all the way to the lower end of the pad side portion 18B.

Figure 11:
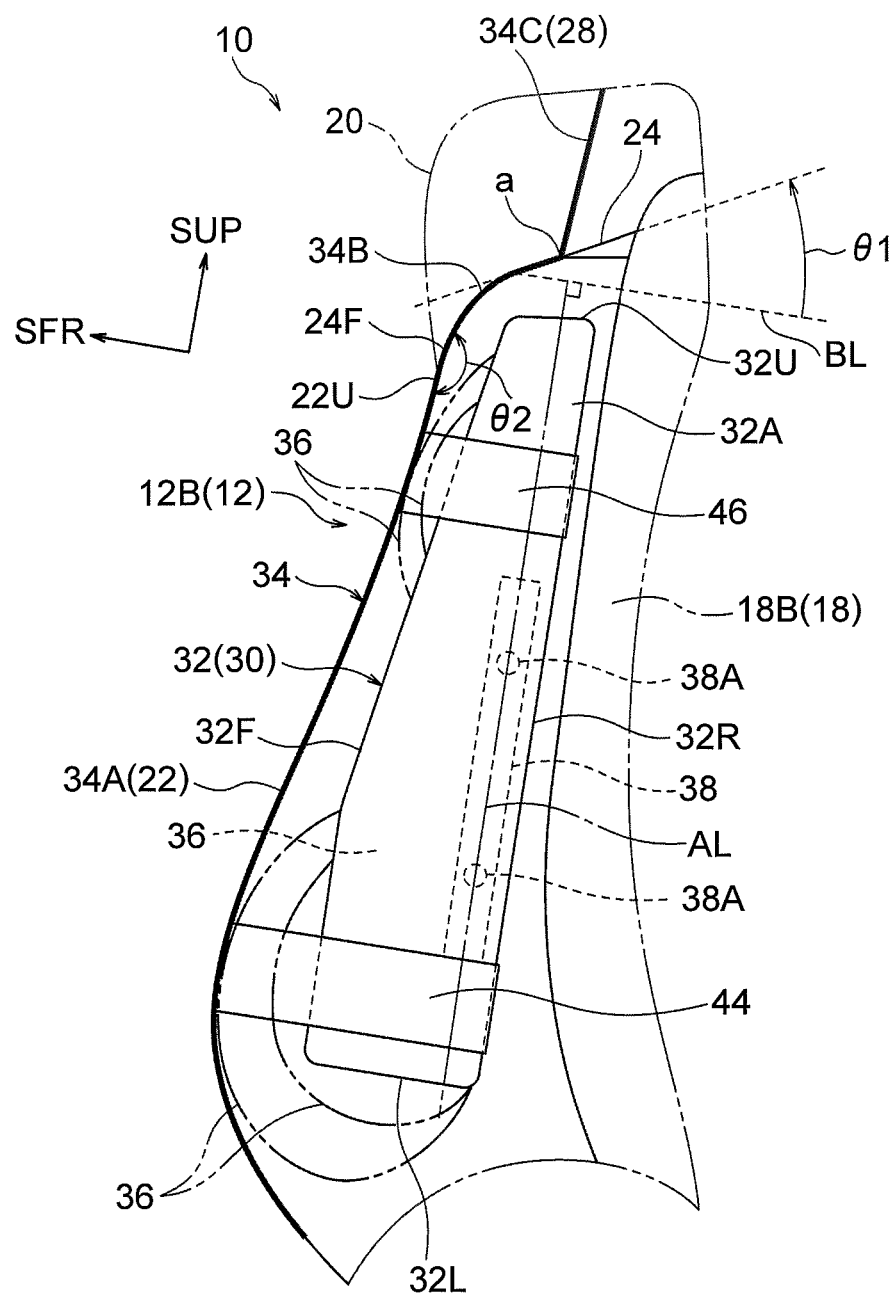
FIG. 11 is a side view that corresponds to FIG. 4 and is for explaining breakage of a burst line portion.

Moreover, in the present embodiment, the above-described lateral burst line portion 34B is inclined (see θ1 in FIG. 4) toward the seatback upper side while heading toward the seatback rear side, with respect to a line BL normal to the inflator center that is shown in FIG. 4 and FIG. 11. As seen in a seat side view, this line BL normal to the inflator center extends in a direction orthogonal to the axial direction of the inflator 38, i.e., extends in the seatback longitudinal direction. Due to the lateral burst line portion 34B being set in this way, angle θ2 that is formed by the upper end side of the front side burst line portion 34A and the front end side of the lateral burst line portion 34B is set to be an obtuse angle.

Further, the above-described vertical burst line portion 34C is positioned further toward the seatback upper side than the lateral slit portion 64B and further toward the seatback front side than a rear end 64B1 of the lateral slit portion 64B (refer to arrow P4 in FIG. 4). This vertical burst line portion 34C is set so as to extend toward the seatback upper side from point a (see FIG. 4) at which the lateral sewn portion 24, that extends from the upper end of the front side sewn portion 22 obliquely toward the seatback rear side and upper side, becomes an angle that is near parallel to the line BL normal to the inflator center.

Figure 5:
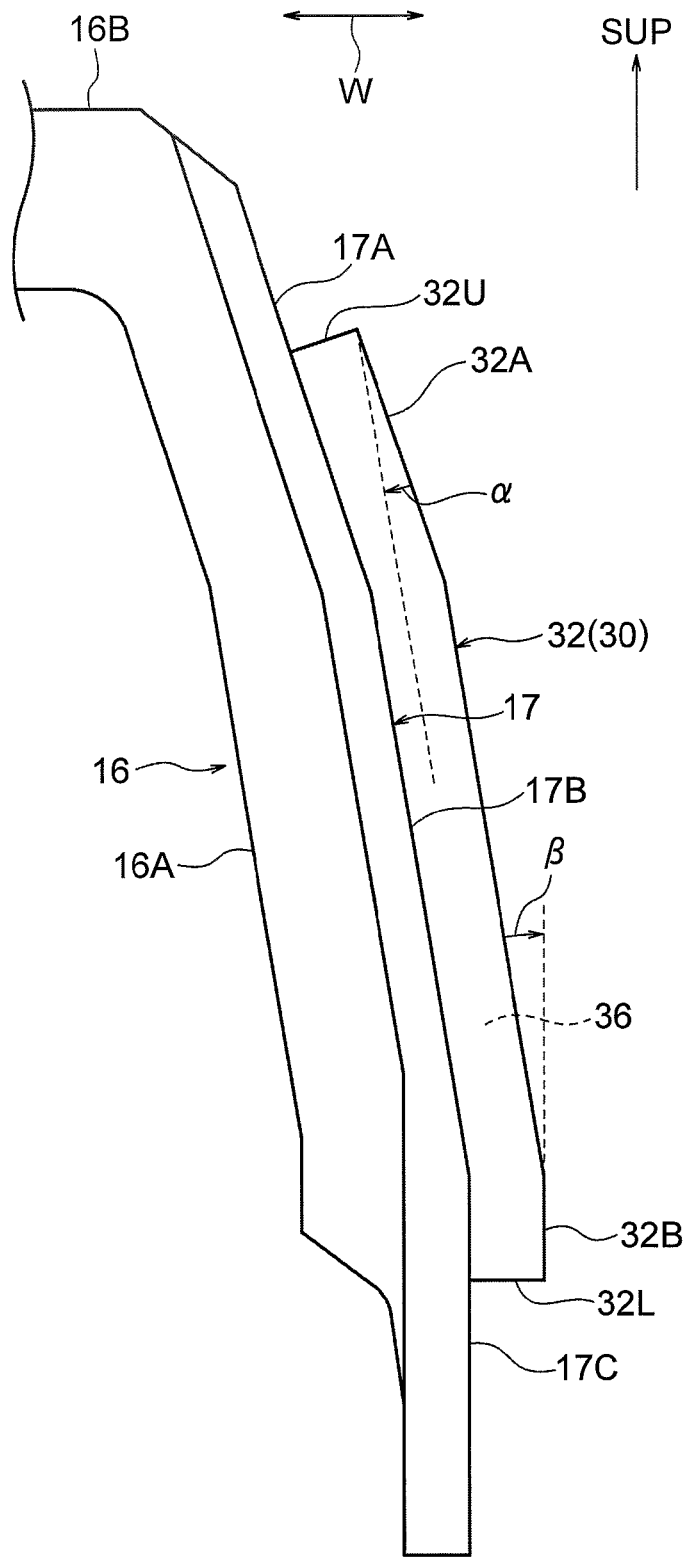
FIG. 5 is a front view showing a side frame and the airbag package of the seatback.

Moreover, in the present embodiment, as shown in FIG. 5, the upper portion of the seat transverse direction outer side surface 17 of the left side frame 16A is made to be an inclined surface 17A that heads obliquely toward the seat transverse direction outer side and upper side (toward the seat transverse direction outer side and the seatback upper side). This inclined surface 17A is inclined such that the normal line thereof extends obliquely toward the seat transverse direction outer side and upper side. The inclined surface 17A is inclined (refer to a in FIG. 5) toward the seat transverse direction inner side with respect to a general surface 17B that is the vertical direction intermediate portion of the seat transverse direction outer side surface 17.

The rear portion side of an upper portion 32A of the airbag package 32 (the region marked by hatching in FIG. 4) faces this inclined surface 17A from the seat transverse direction outer side. The upper portion 32A of the airbag package 32 is bent so as to run along the inclined surface 17A, and the rear portion side of the upper portion 32A abuts the inclined surface 17A. At the upper portion 32A of the airbag package 32, the upper portion side of the side airbag 36 that is folded-up (the region that restrains the shoulder portion S or the head portion H) is enveloped by the aforementioned wrapping material 40.

Further, in the present embodiment, the lower portion of the seat transverse direction outer side surface 17 at the left side frame 16A is made to be a vertical surface (a surface parallel to line W) 17C that faces toward the seat transverse direction outer side. This vertical surface 17C is formed vertically as seen from the seatback longitudinal direction, such that the normal line thereof extends toward the seat transverse direction outer side. The aforementioned general surface 17B is inclined (refer to β in FIG. 5) toward the seat transverse direction inner side with respect to the vertical surface 17C.

The rear portion side of a lower end portion 32B of the airbag package 32 (the region marked by hatching in FIG. 4) faces this vertical surface 17C from the seat transverse direction outer side. The lower end portion 32B of the airbag package 32 is bent so as to run along the vertical surface 17C, and the rear portion side of the lower end portion 32B abuts the vertical surface 17C. At the lower end portion 32B of this airbag package 32, the lower end portion of the side airbag 36 that is folded up (the region that restrains the lumbar portion L or the abdominal portion B) is enveloped by the aforementioned wrapping material 40.

(Operation and Effects)

Operation and effects of the present embodiment are described next.

In the vehicle seat 10 that has the above-described structure, the airbag package 32 that is disposed within the left-side side portion 12B of the seatback 12 is structured to include the side airbag 36 that is folded-up. This side airbag 36 can, in the inflated and expanded state, restrain at least the region from the abdominal portion B to the shoulder portion S of the vehicle occupant P. At the time of inflation and expansion of this side airbag 36, the side airbag 36 passes-through the slit 64 of the seatback pad 18, and ruptures the burst line portion 34 of the seatback skin 20.

The slit 64 includes the vertical slit portion 64A that is positioned at the seat transverse direction outer side of the front edge portion 32F of the airbag package 32. This vertical slit portion 64A extends toward the upper and lower sides of the left-side side portion 12B along the front edge portion 32F, and the upper end 64A1 is positioned further toward the seatback rear side than the lower end 64A2. Therefore, at the side airbag 36, the region that passes-through the upper end 64A1 side of the vertical slit portion 64A inflates and expands from further toward the seatback rear side than the region that passes-through the lower end 64A2 side of the vertical slit portion 64A.

As a result, at the side airbag 36, the difference in the expanding directions, as seen in plan view, of the region that passes-through the upper end 64A1 side of the vertical slit portion 64A and inflates and expands at the side of the shoulder portion S, and the region that passes-through the lower end side of the vertical slit portion 64A and inflates and expands at the side of the chest portion C and the abdominal portion B, can be made to be small. Due thereto, controlling (adjusting) of the expanding direction of the side airbag 36, that can restrain at least the region from the abdominal portion B to the shoulder portion S of the vehicle occupant P, is easy, and therefore, this contributes to stabilization of the expanding direction.

The above-described effect is described by using FIG. 6A, FIG. 6B and FIG. 7. Note that, in FIG. 7, the cut cross-section along line F7A-F7A of FIG. 6A is schematically shown by the solid line, and the cut cross-section along line F7B-F7B of FIG. 6A is schematically shown by the two-dot chain line.

As shown in FIG. 6B, width W1 of the shoulder portion S of the vehicle occupant P is greater than width W2 of the chest portion C and the abdominal portion B. Therefore, the region of the side airbag 36 that inflates and expands at the side of the shoulder portion S (the shoulder restraining portion) must be inflated and expanded at an angle θ3 (see FIG. 7) toward the seat transverse direction outer side. As a result, a difference arises between the expanding direction (refer to arrow D1 in FIG. 7) of the region of the side airbag 36 that inflates and expands at the side of the chest portion C and the abdominal portion B, and the expanding direction (refer to arrow D2 in FIG. 7) of the aforementioned shoulder restraining portion.

In a case in which the difference angle θ3, as seen in a plan view, between the expanding direction D1 and the expanding direction D2 is large, controlling of the expanding direction of the side airbag 36 is difficult. However, in the present embodiment, the difference angle θ3 can be set to be small by positioning the upper end 64A1 side of the vertical slit portion 64A, through which the shoulder restraining portion passes at the time of inflation and expansion of the side airbag 36, further toward the seatback rear side than the lower end 64A2 side. The above-described effects are thereby obtained.

Figure 8:
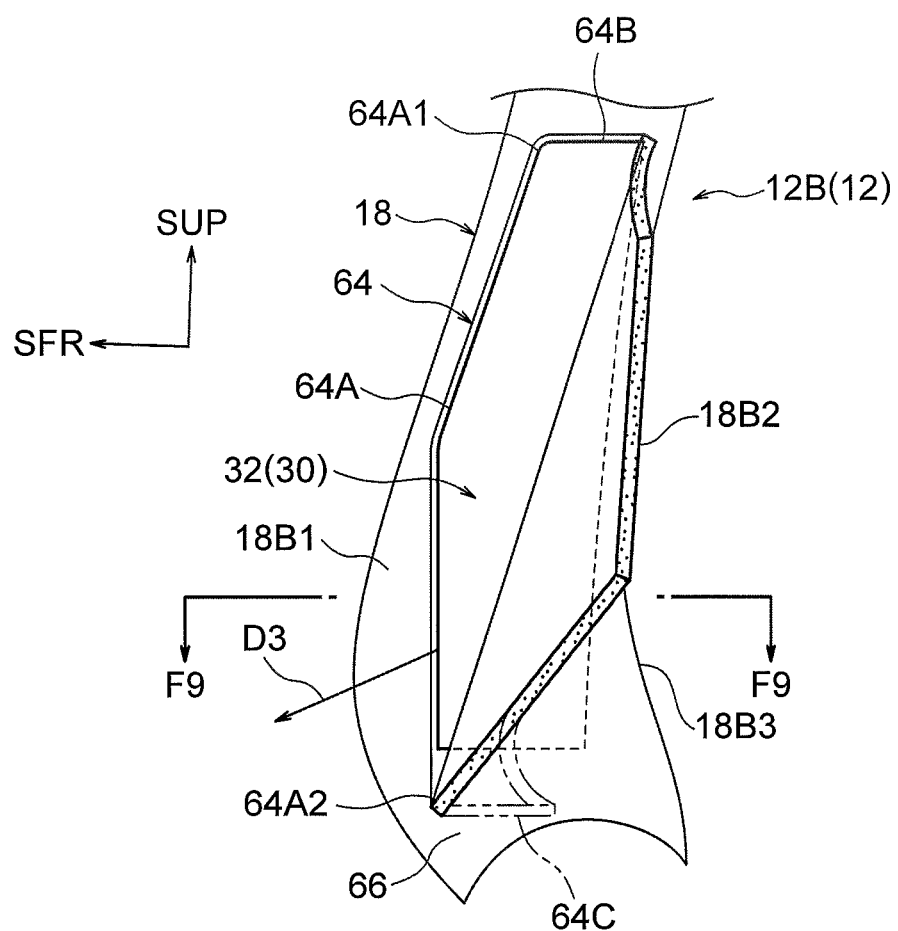
FIG. 8 is a side view showing a state in which a side wall portion of a seatback pad of the seatback has expanded toward a seat transverse direction outer side.
Figure 9:
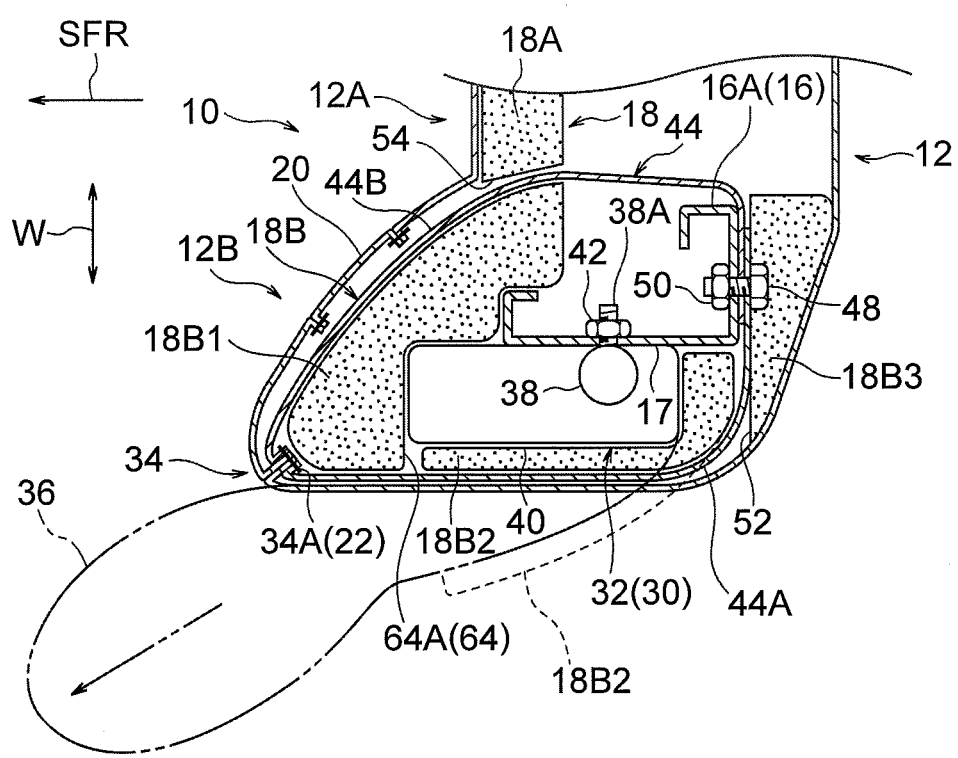
FIG. 9 is a cross-sectional view that corresponds to FIG. 2 and is for explaining expansion of the side wall portion of the seatback pad.

Further, in the present embodiment, the lateral slit portion 64B, that extends toward the seatback rear side from the upper end 64A1 of the vertical slit portion 64A, is formed in the seatback pad 18. Therefore, at the time when the side airbag 36 passes through the vertical slit portion 64A and inflates and expands, as shown in FIG. 8, the side wall portion 18B2 of the pad side portion 18B expands greatly toward the seat transverse direction outer side, beneath the lateral slit portion 64B.

Due thereto, the vertical slit portion 64A, and the upper end 64A1 side in particular, is enlarged toward the seatback rear side. As a result, at the side airbag 36, the region, that passes through the upper end 64A1 side of the vertical slit portion 64A and inflates and expands, inflates and expands from further toward the seatback rear side. Due thereto, the difference angle θ3 can be made to be smaller, and therefore, stabilization of the expanding direction of the side airbag 36 can be promoted.

Moreover, in the present embodiment, the lower end 64A2 of the vertical slit portion 64A is positioned further toward the seatback lower side than the lower edge portion 32L of the airbag package 32. Therefore, at the time when the side airbag 36 passes-through the vertical slit portion 64A and inflates and expands, it is easy for the lower end 64A2 side of the vertical slit portion 64A to open widely in a vicinity of the lower edge portion 32L of the airbag package 32 (see FIG. 8 and FIG. 9).

Due thereto, the expanding direction (refer to arrow D3 in FIG. 8) of the region of the side airbag 36 that passes-through the lower end 64A2 side of the vertical slit portion 64A and inflates and expands, becoming unstable due to interference with the seatback pad 18 can be prevented or suppressed. As a result, stabilization of the expanding direction of the side airbag 36 can be further promoted. Note that this effect is further improved in a case in which the slit 64 has the lower lateral slit portion 64C (refer to the two-dot chain line in FIG. 8).

Further, in the present embodiment, at the heightwise range where the vertical slit portion 64A is positioned at the seatback 12, the region from the upper end 64A1 to the lower end 64A2 of the vertical slit portion 64A is positioned further toward the seatback rear side than the burst line portion 34. Therefore, there is no need for some of the expansion force to be directed toward the seatback rear side in order for the side airbag 36, that passes-through the vertical slit portion 64A and inflates and expands, to break the burst line portion 34 of the seatback skin 20. This contributes to making the inflation and expansion of the side airbag 36 be earlier.

Namely, because the side airbag 36 must restrain the vehicle occupant P at an early stage, the expansion propulsion force toward the seatback front side is set to be large. Therefore, in a case in which, as in a comparative example 100 shown in FIG. 10, a burst line portion 102 is positioned further toward the seatback rear side than the vertical slit portion 64A, some of the expansion force of the side airbag 36 toward the seatback front side must be changed to expansion force that is toward the seatback rear side and the seat transverse direction outer side. Accordingly, the inflation and expansion of the side airbag 36 are delayed by the amount of time that is needed for this change. However, this can be avoided in the present embodiment.

Figure 10:
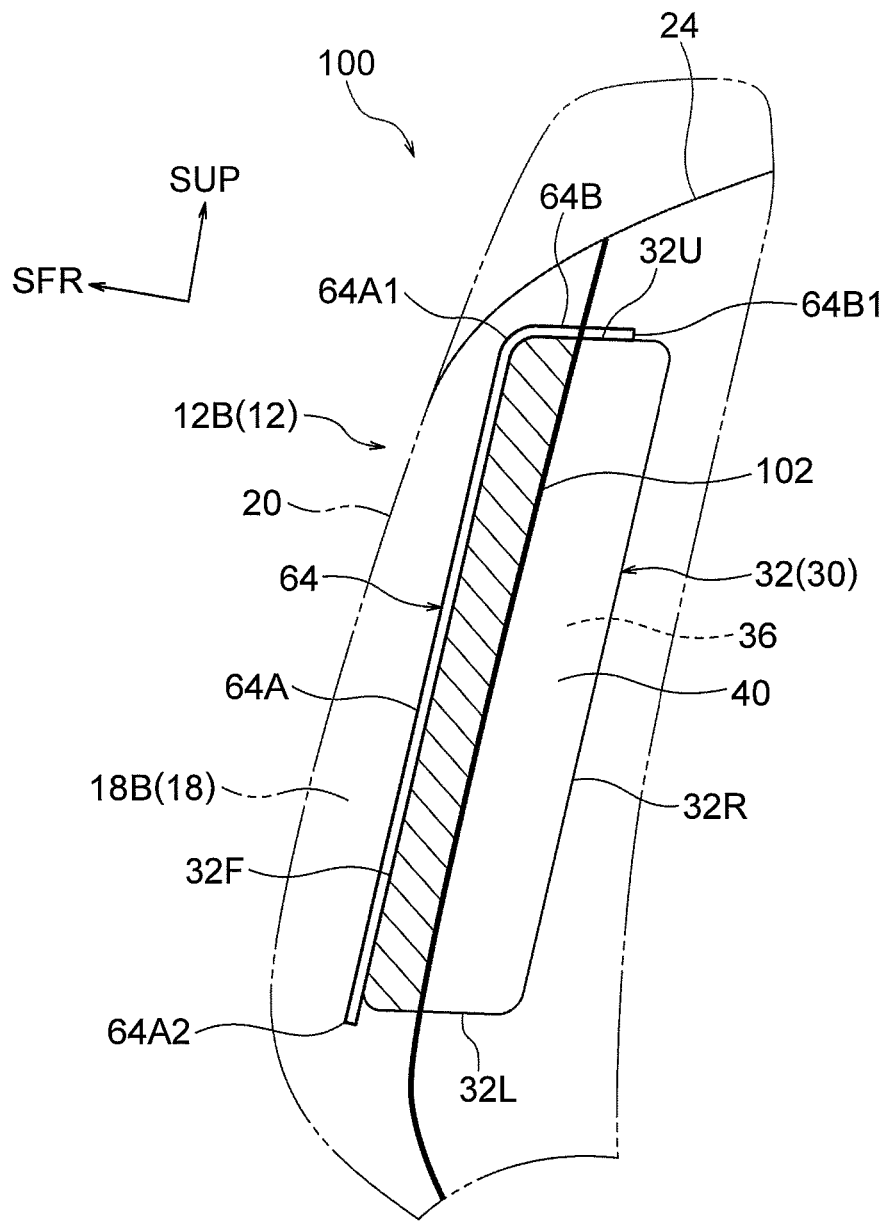
FIG. 10 is a side view showing the structure of the periphery of an airbag package at a seatback relating to a comparative example.

Further, in the comparative example 100, there is the possibility that the side airbag 36, that passes-through the vertical slit portion 64A and inflates and expands, will catch on a region of the seatback skin 20 which region is further toward the seatback front side than the burst line portion 34 (refer to the region marked by hatching in FIG. 10). As a result, there is the possibility that poor expansion will occur. However, in the present embodiment, the occurrence of poor expansion that is caused by such catching can be prevented or suppressed.

Moreover, in the present embodiment, the inflation pressure of the side airbag 36 is transmitted to the burst line portion 34 via the upper side webbing 46 and the lower side webbing 44 (see FIG. 11), and the burst line portion 34 starts to break from the front side burst line portion 34A. The breaking of the front side burst line portion 34A propagates from the upper end portion of the front side burst line portion 34A to the front end portion of the lateral burst line portion 34B.

This lateral burst line portion 34B extends obliquely toward the seatback rear side and upper side, along the side surface of the left-side side portion 12B. The angle θ2 (see FIG. 4 and FIG. 11) that is formed by the upper end side of the front side burst line portion 34A and the lateral burst line portion 34B is set to be an obtuse angle. Due thereto, as compared with a case in which, for example, the aforementioned formed angle θ2 is a right angle, the propagation of the breakage from the front side burst line portion 34A to the lateral burst line portion 34B can be made to be smooth.

Figure 12:
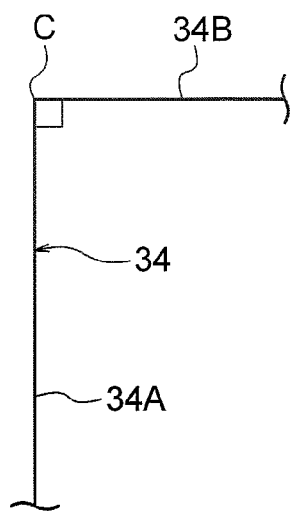
FIG. 12 is a schematic drawing for explaining a shape of the burst line portion at which it is easy for breakage to stop in the midst thereof.
Figure 13:
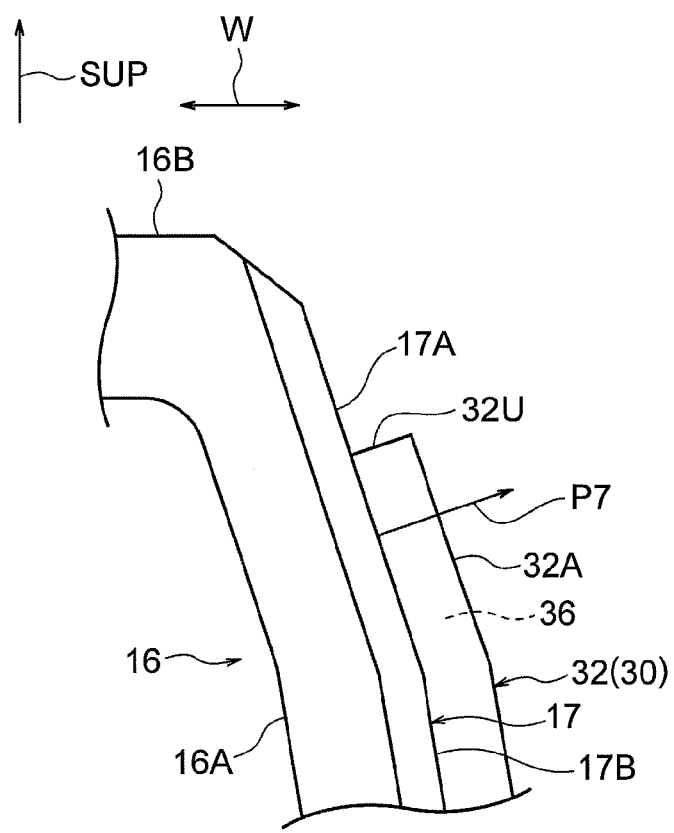
FIG. 13 is a front view that corresponds to a portion of FIG. 5 and is for explaining expansion reaction force that an upper portion side of a side airbag receives from an inclined surface of the side frame.
Figure 14:
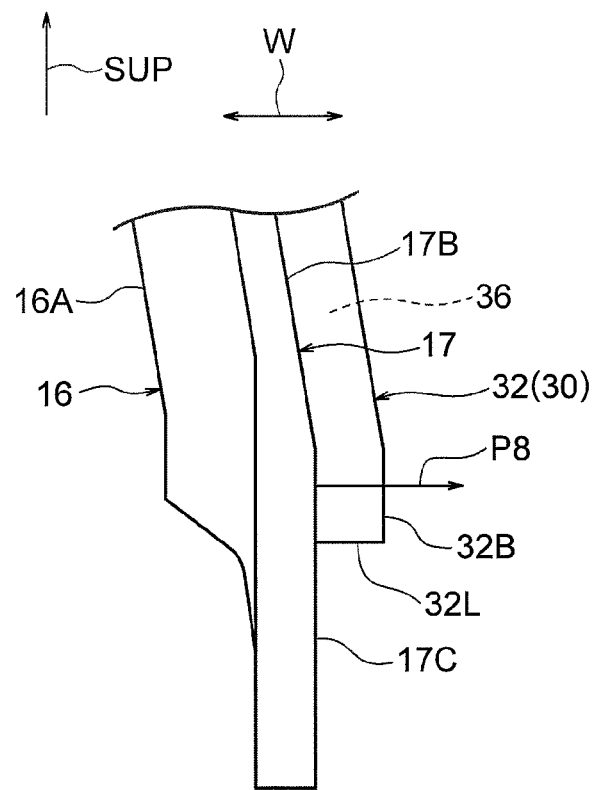
FIG. 14 is a front view that corresponds to a portion of FIG. 5 and is for explaining expansion reaction force that a lower portion side of the side airbag receives from a vertical surface of the side frame.

Namely, as shown in FIG. 12, in a case in which the angle θ2, that is formed by the front end side of the lateral burst line portion 34B and the upper end side of the front side burst line portion 34A that is the origin of the breakage, is set to be a right angle, there is the possibility that the breaking will stop at the connected portion (point C in FIG. 12) of the front side burst line portion 34A and the lateral burst line portion 34B. Because this can be avoided in the present embodiment, the burst line portion 34 can be broken smoothly and rapidly. As a result, this contributes to making the inflation and expansion of the side airbag 36 be earlier. Note that, the greater that the aforementioned formed angle θ2 is set to be, the faster that the breakage speed of the burst line portion 34 can be made to be.

Further, in the present embodiment, the burst line portion 34 has the vertical burst line portion 34C that extends toward the seatback upper side from a longitudinal direction intermediate portion of the lateral burst line portion 34B. Therefore, the burst line portion 34 can be broken to further toward the upper end side of the seatback 12. Due thereto, it is easy for the upper portion side of the side airbag 36 to inflate and expand toward the seatback upper side, and therefore, stabilization of the expanding direction of this upper portion side can be promoted.

Further, in the present embodiment, the vertical burst line portion 34C is set upward from point a at which the lateral sewn portion 24 becomes an angle that is near parallel to the line BL normal to the inflator center. This vertical burst line portion 34C is positioned further toward the seatback upper side than the lateral slit portion 64B, and further toward the seatback front side than the rear end 64B1 of the lateral slit portion 64B.

Due thereto, the inflation pressure of the upper portion side of the side airbag 36, that passes-through the slit 64 and inflates and expands toward the seatback front side and the seatback upper side, can be applied well to the vertical burst line portion 34C. As a result, the vertical burst line portion 34C can be broken well up to the upper end side thereof. Therefore, the side airbag 36 catching on a region of the seatback skin 20, which region is further toward the seatback front side than the vertical burst line portion 34C, can be prevented or suppressed. Due thereto, the occurrence of poor expansion that is caused by this catching can be prevented or suppressed.

Moreover, in the present embodiment, the upper portion of the seat transverse direction outer side surface 17 at the left side frame 16A of the seatback 12 is made to be the inclined surface 17A. The rear portion side of the upper portion 32A of the airbag package 32 faces this inclined surface 17A. Because the inclined surface 17A is directed obliquely toward the seat transverse direction outer side and upper side, the upper portion side of the airbag 36, that is folded-up at the upper portion 32A of the airbag package 32, receives, from the inclined surface 17A, expansion reaction force (refer to arrow P7 in FIG. 13) that is directed obliquely toward the seat transverse direction outer side and upper side. Due thereto, it is easy for the upper portion side of the side airbag 36 to inflate and expand toward the seatback upper side as seen in a seat front view, and therefore, the expanding direction of the upper portion side of the side airbag 36 can be stabilized so as to head toward the side of the shoulder portion S or the side of the head portion H of the vehicle occupant P.

Figure 15:
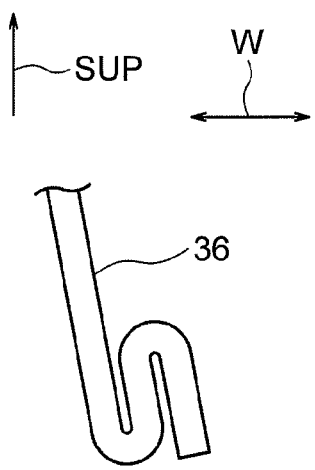
FIG. 15 is an explanatory drawing for explaining a case in which a lower end portion of the side airbag is folded-up in a substantial Z-shape.

Further, in the present embodiment, the lower portion of the seat transverse direction outer side surface 17 of the left side frame 16A is made to be the vertical surface 17C, and the lower end portion 32B of the airbag package 32 corresponds to this vertical surface 17C. Because the vertical surface 17C faces toward the seat transverse direction outer side, the lower end side of the airbag 36, that is folded-up at the lower end portion 32B of the airbag package 32, receives, from the vertical surface 17C, expansion reaction force (refer to arrow P8 in FIG. 14) that is directed toward the seat transverse direction outer side. Due thereto, the lower end side of the side airbag 36, i.e., the region that restrains the abdominal portion B or the lumbar portion L of the vehicle occupant P, inadvertently rising-up toward the seatback upper side at the time of inflation and expansion can be prevented or suppressed. Note that this effect can be promoted by folding the lower end side of the side airbag 36 up in a substantial Z-shape as shown in FIG. 15.

Supplementary Explanation of Embodiment

Figure 16:
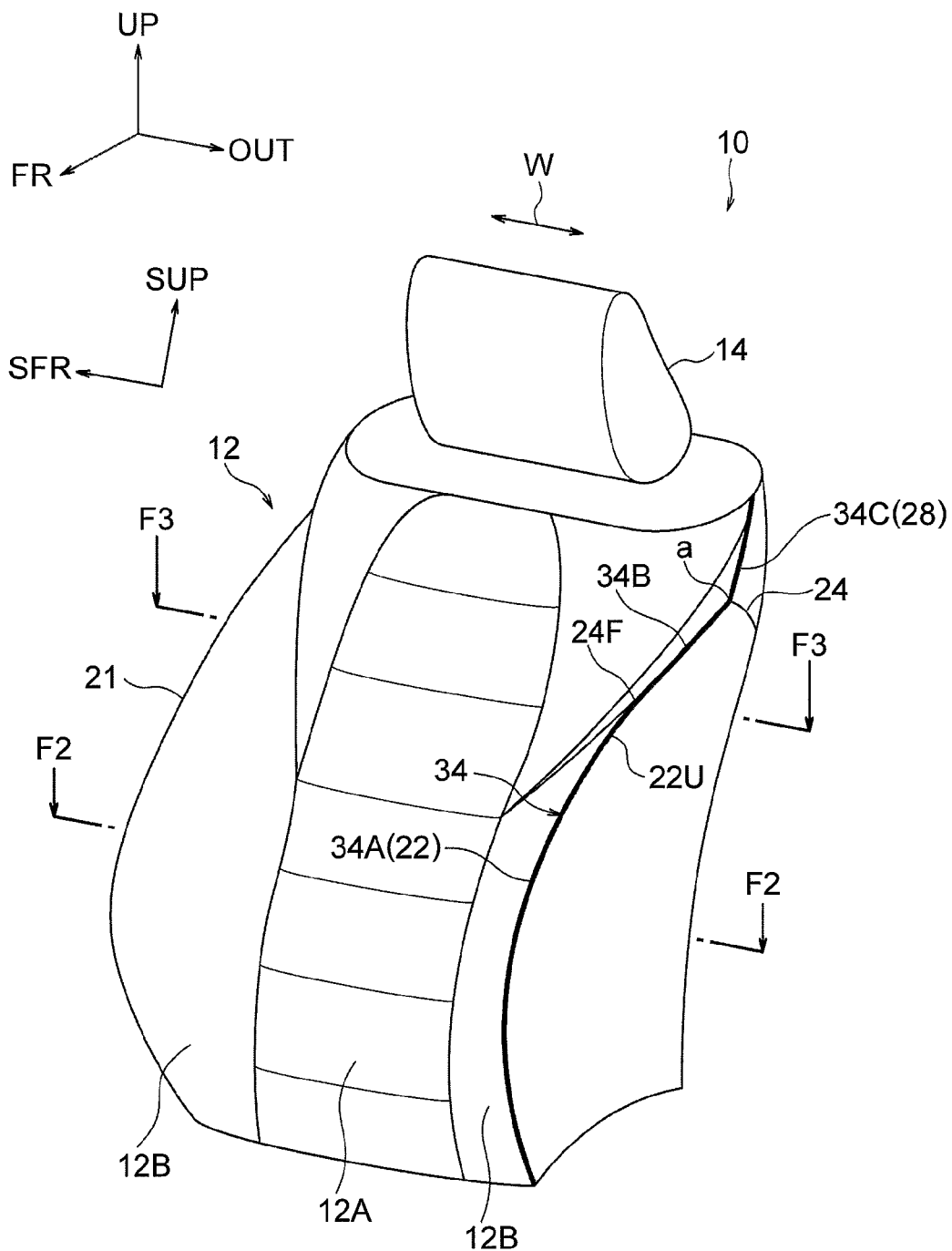
FIG. 16 is a perspective view that corresponds to FIG. 1 and shows a modified example of the sewing pattern of a seatback skin.

The sewn pattern of the seatback skin 20 is not limited to that shown in FIG. 1, and can be changed as appropriate. For example, the sewn pattern can be set like the modified example that is shown in FIG. 16. In this modified example, the cut cross-section along line F2-F2 of FIG. 16 and the cut cross-section along line F3-F3 are basically similar to the cut cross-sections that are shown in FIG. 2 and FIG. 3. Further, in FIG. 16, the lines that are drawn on the surface of the seatback 12 all illustrate sewn portions.

Figure 17:
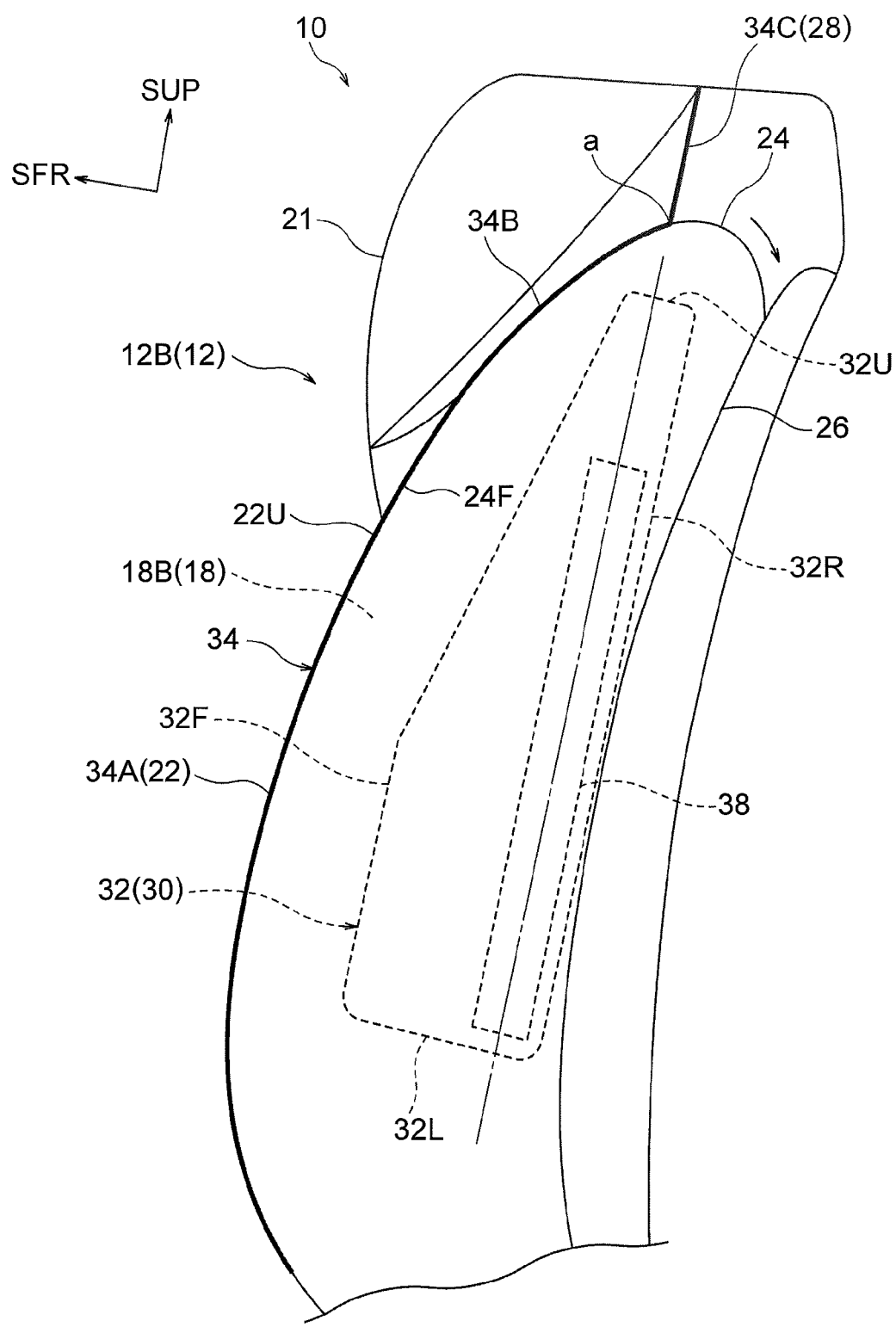
FIG. 17 is a side view of the seatback shown in FIG. 16.

At a seatback skin 21 relating to this modified example, as shown in FIG. 17, the rear portion side of the lateral sewn portion 24 extends obliquely toward the seatback rear side and lower side, and the lateral sewn portion 24 is formed in the shape of a mountain that is convex toward the seatback upper side. Further, the vertical sewn portion 28 (the vertical burst line portion 34C) extends toward the seatback upper side from point a that is further toward the seatback front side than the peak of the lateral sewn portion 24. The region at the lateral sewn portion 24, which region is further toward the seatback front side than point a, is made to be the lateral burst line portion 34B. By setting the vertical burst line portion 34C in this way, propagation of the breaking from the lateral burst line portion 34B to the vertical burst line portion 34C can be made to be smooth.

In addition, the present invention can be implemented by being modified in various ways within a scope that does not depart from the gist thereof. Further, the scope of the right of the present invention is, of course, not limited to the above-described embodiments.

What is claimed is:

1. A vehicle seat that is equipped with a side airbag device, the vehicle seat comprising:
    an airbag package that includes a side airbag that is housed in a state of being folded-up within a side portion of a seatback, the side airbag being able to restrain at least a region from an abdominal portion to a shoulder portion of a vehicle occupant in an inflated and expanded state;
    a seatback skin at which a burst line portion, that extends toward upper and lower sides of the side portion at a seatback front side of the airbag package, receives inflation pressure of the side airbag and breaks; and
    a seatback pad in which a vertical slit portion, that is positioned further toward a seat transverse direction outer side than a front edge portion of the airbag package, extends toward the upper and lower sides of the side portion along the front edge portion, the side airbag inflating and expanding with passing-through the vertical slit portion, and an upper end of the vertical slit portion being positioned further toward a seatback rear side than a lower end of the vertical slit portion.

2. The vehicle seat that is equipped with a side airbag device of claim 1, wherein the seatback pad has a lateral slit portion that extends from the upper end of the vertical slit portion toward the seatback rear side.

3. The vehicle seat that is equipped with a side airbag device of claim 1, wherein the lower end of the vertical slit portion is positioned further toward a seatback lower side than a lower edge portion of the airbag package.

4. The vehicle seat that is equipped with a side airbag device of claim 1, wherein the burst line portion includes:
    a front side burst line portion that extends toward the upper and lower sides of the side portion at a front portion of the side portion, and
    a lateral burst line portion that is connected to the front side burst line portion at an upper portion side of the side portion, and that extends obliquely toward a seatback rear side and upper side along a side surface of the side portion.

5. The vehicle seat that is equipped with a side airbag device of claim 4, wherein the burst line portion further includes a vertical burst line portion that extends toward a seatback upper side from an intermediate portion of the lateral burst line portion.

6. The vehicle seat that is equipped with a side airbag device of claim 5, wherein
    the seatback pad has a lateral slit portion that extends toward the seatback rear side from the upper end of the vertical slit portion, and
    the vertical burst line portion is positioned further toward the seatback upper side than the lateral slit portion and further toward the seatback front side than a rear end of the lateral slit portion.

7. The vehicle seat that is equipped with a side airbag device of claim 5, wherein
    the front side burst line portion is structured by a front side sewn portion, and the lateral burst line portion is structured by a front portion side of a lateral sewn portion, and the vertical burst line portion is structured by a vertical sewn portion, and
    a rear portion side of the lateral sewn portion extends obliquely toward a seatback rear side and lower side, and the lateral sewn portion is formed so as to be convex toward the seatback upper side, and the vertical sewn portion extends toward the seatback upper side from a point that is further toward the seatback front side than a peak of the lateral sewn portion.

8. The vehicle seat that is equipped with a side airbag device of claim 5, wherein the vertical slit portion is positioned at the seatback rear side with respect to the front side burst line portion, the vertical slit portion is positioned at the seatback rear side and a seatback lower side with respect to the lateral burst line portion, and the vertical slit portion is positioned at the seatback lower side with respect to the vertical burst line portion.

9. The vehicle seat that is equipped with a side airbag device of claim 4, wherein an angle that is formed by an upper end side of the front side burst line portion and the lateral burst line portion is set to be an obtuse angle.

10. The vehicle seat that is equipped with a side airbag device of claim 1, wherein, at a heightwise range of the seatback where the vertical slit portion is positioned, a region of the vertical slit portion from the upper end to the lower end thereof is positioned further toward the seatback rear side than the burst line portion.

11. The vehicle seat that is equipped with a side airbag device of claim 1, wherein
    an upper portion of a seat transverse direction outer side surface of a side frame of the seatback includes an inclined surface that faces obliquely toward a seat transverse direction outer side and upper side, and
    an upper portion of the airbag package includes a region that faces the inclined surface.

12. The vehicle seat that is equipped with a side airbag device of claim 1, wherein
- a lower portion of a seat transverse direction outer side surface of a side frame of the seatback includes a vertical surface that faces toward a seat transverse direction outer side, and
- a lower end portion of the airbag package includes a region that faces the vertical surface.

13. The vehicle seat that is equipped with a side airbag device of claim 1, wherein a lower portion of the vertical slit portion extends along a seatback vertical direction, and a vertical direction intermediate portion and an upper portion of the vertical slit portion is inclined with respect to the seatback vertical direction, so as to head toward the seatback rear side while heading toward a seatback upper side.

* * * * *